(12) United States Patent
de Almeida Barreto et al.

(10) Patent No.: US 9,367,928 B2
(45) Date of Patent: Jun. 14, 2016

(54) METHOD FOR ALIGNING AND TRACKING POINT REGIONS IN IMAGES WITH RADIAL DISTORTION THAT OUTPUTS MOTION MODEL PARAMETERS, DISTORTION CALIBRATION, AND VARIATION IN ZOOM

(71) Applicant: UNIVERSIDADE DE COIMBRA, Coimbra (PT)

(72) Inventors: Joao Pedro de Almeida Barreto, Coimbra (PT); Antonio Miguel Marques Rodrigues Teixeira Lourenco, Viseu (PT); Rui Jorge Melo Teixeira, Coimbra (PT)

(73) Assignee: Universidade de Coimbra, Coimbra (PT)

( * ) Notice: Subject to any disclaimer, the term of this patent is extended or adjusted under 35 U.S.C. 154(b) by 0 days.

(21) Appl. No.: 14/433,457

(22) PCT Filed: Oct. 7, 2013

(86) PCT No.: PCT/PT2013/000057
§ 371 (c)(1),
(2) Date: Apr. 3, 2015

(87) PCT Pub. No.: WO2014/054958
PCT Pub. Date: Apr. 10, 2014

(65) Prior Publication Data
US 2015/0254872 A1    Sep. 10, 2015

(30) Foreign Application Priority Data

Oct. 5, 2012 (PT) .......................................... 106564

(51) Int. Cl.
*G06K 9/00*  (2006.01)
*G06T 7/20*  (2006.01)
(Continued)

(52) U.S. Cl.
CPC .............. *G06T 7/208* (2013.01); *G06K 9/6203* (2013.01); *G06T 3/0093* (2013.01); *G06T 5/006* (2013.01);
(Continued)

(58) Field of Classification Search
CPC combination set(s) only.
See application file for complete search history.

(56) References Cited

U.S. PATENT DOCUMENTS 6,047,088 A * 4/2000 van Beek ................ G06T 9/001
375/E7.083
6,072,496 A * 6/2000 Guenter ............. G06K 9/00201
345/419

(Continued)

OTHER PUBLICATIONS

K. Vijayan-Asari, S. Kumar, and D. Radhakrishnan, "A new approach for nonlinear distortion correction in endoscopic images based on least squares estimation," IEEE Transactions on Medical Imaging, vol. 18, No. 4, pp. 345-354, Apr. 1999.

(Continued)

*Primary Examiner* — Alex Liew
(74) *Attorney, Agent, or Firm* — Greenberg Traurig, LLP; David J. Dykeman; Andrew Abramson

(57) ABSTRACT

The present invention relates to a method for matching point regions in images with radial distortion that, given two frames acquired by a camera with radial distortion, estimates the global image distortion and the local transformations undergone by the image regions between frames, with the objective of accurately tracking an aligning these image regions in a sequence of frames, calibrating the radial distortion using only moving image points, or estimating the relative change in focal length in cameras with radial distortion and variable zoom using only moving image points, and that comprises the following steps: extracting local image features; tracking local features; and determining the radial distortion calibration based on a computational efficient procedure that uses the information for all local features being tracked.

19 Claims, 5 Drawing Sheets

(a) Sample sequence with RD = 30%

(b) Window Size = 11    (c) Window Size = 50

(51) Int. Cl.
G06K 9/62 (2006.01)
G06T 3/00 (2006.01)
G06T 5/00 (2006.01)
G06T 11/00 (2006.01)

(52) U.S. Cl.
CPC ............. *G06T 7/2033* (2013.01); *G06T 7/2066* (2013.01); *G06T 11/001* (2013.01); *G06T 2207/10016* (2013.01); *G06T 2207/10068* (2013.01); *G06T 2207/20016* (2013.01); *G06T 2207/20024* (2013.01)

(56) References Cited

U.S. PATENT DOCUMENTS

| | | | |
|---|---|---|---|
| 7,429,999 B2 | 9/2008 | Poulin | |
| 7,750,969 B2 | 7/2010 | Sato | |
| 7,751,865 B2 | 7/2010 | Jascob | |
| 7,808,525 B2 | 10/2010 | Katayama | |
| 7,892,165 B2 | 2/2011 | Nakamura | |
| 8,223,193 B2 | 7/2012 | Zhao | |
| 8,902,232 B2 * | 12/2014 | Debevec | G06T 13/40 345/423 |
| 2005/0085720 A1 | 4/2005 | Jascob | |
| 2005/0089199 A1* | 4/2005 | Marschner | G06K 9/4661 382/118 |
| 2005/0270375 A1 | 12/2005 | Poulin | |
| 2005/0280709 A1 | 12/2005 | Katayama | |
| 2006/0239345 A1* | 10/2006 | Taubman | H04N 19/52 375/240.03 |
| 2008/0075324 A1 | 3/2008 | Sato | |
| 2008/0097156 A1 | 4/2008 | Nakamura | |
| 2010/0245541 A1 | 9/2010 | Zhao | |
| 2011/0075922 A1* | 3/2011 | Turner | H04N 13/026 382/164 |
| 2011/0115798 A1* | 5/2011 | Nayar | G06T 13/40 345/473 |
| 2013/0034203 A1* | 2/2013 | Wang | A61B 6/03 378/41 |
| 2014/0022248 A1* | 1/2014 | Kuffner, Jr. | G06T 17/20 345/420 |
| 2014/0285676 A1 | 9/2014 | Barreto et al. | |

OTHER PUBLICATIONS

J. Helferty, C. Zhang, G. McLennan, and W. Higgins, "Videoendoscopic distortion correction and its application to virtual guidance of endoscopy," IEEE Transactions on Medical Imaging, vol. 20, No. 7, pp. 605-617, Jul. 2001.
Kalman, R.E.; A New Approach to Linear Filtering and Prediction Problems; ASME—Journal of Basic Engineering, 82 (Series D): 35-45; Mar. 1960.
T. Stehle, M. Hennes, S. Gross, A. Behrens, J. Wulff, and T. Aach, "Dynamic Distortion Correction for Endoscopy Systems with Exchangeable Optics," in Bildverarbeitungfür die Medizin 2009. Berlin: Springer, pp. 142-146, 2009.
J.-Y. Bouguet. Camera Calibration Toolbox for Matlab. [Online]. Available: http://www.vision.caltech.edu/bouguetj/calibdoc/index.html#ref; Last Updated Oct. 14, 2015.
Z. Zhang, "Flexible camera calibration by viewing a plane from unknown orientations," in ICCV, pp. 666-673, Sep. 1999.
R. Shahidi, M. Bax, C. Maurer, J. Johnson, E. Wilkinson, B. Wang, J. West, M. Citardi, K. Manwaring, and R. Khadem, "Implementation, calibration and accuracy testing of an image-enhanced endoscopy system," IEEE Transactions on Medical Imaging, vol. 21, No. 12, pp. 1524-1535, Dec. 2002.
C. Wengert, M. Reef f, P. Cattin, and G. Sz'ekely, "Fully automatic endoscope calibration for intraoperative use," in Bildverarbeitungfür die Medizin 2006, pp. 419-423, Mar. 2006.
J. Mallon and P. F. Whelan, "Which pattern? Biasing aspects of planar calibration patterns and detection methods," Pattern Recognition Letters, vol. 28, No. 8, pp. 921-930, Jan. 2007.

S. D. Buck, F. Maes, A. D'Hoore, and P. Suetens, "Evaluation of a novel calibration technique for optically tracked oblique laparoscopes," Proceedings of the 10th international conference on Medical image computing and computer-assisted intervention—vol. Part I, pp. 467-474, Feb. 2007.
A. Fitzgibbon, M. Pilu, and R. Fisher, "Direct least square fitting of ellipses," IEEE Transactions on Pattern Analysis and Machine Intelligence, vol. 21, No. 5, pp. 476-480, May 1999.
Kim, Dong Sik et al.; "Joint Optimization of Spatial Registration and Histogram Compensation for Microscopic Images"; Conference Proceedings: Annual International Conference of the IEEE Engineering in Medicine and Biology Society; pp. 3779-3782; Aug. 30, 2006.
Fitzgibbon, A.W.; "Simultaneous Linear Estimation of Multiple View Geometry and Lens Distortion;" Proceedings of the 2001 IEEE Computer Society Conference on Computer Vision and Pattern Recognition; CVPR 2001, vol. 1, pp. 1-8, Jan. 1, 2001.
Song, KS et al. "Region Adaptive Correction Method for Radial Distortion of Fish-Eye Image;" Image Processing: Algorithms and Systems X; And Parallel Processing For Imaging Applications II, SPIE, vol. 8295, No. 1., pp. 1-7, Feb. 9, 2012.
Kim, Seon Joo et al.; "Joint Feature Tracking and Radiometric Calibration from Auto-Exposure Video"; Computer Vision, 2007, pp. 1-8, Oct. 1, 2007.
Carr, Peter et al.; "Point-less Calibration: Camera Parameters from Gradient-Based Alignment to Edge Images"; Applications of Computer Vision (WACV), pp. 377-384, Jan. 9, 2012.
PCT International Search Report and Written Opinion issued in International Application No. PCT/PT2013/000057 mailed May 27, 2014.
Bruce D. Lucas and Takeo Kanade. An Iterative Image Registration Technique with an Application to Stereo Vision; In DARPA Image Understanding Workshop, pp. 121-130, Apr. 1981.
Simon Baker and Iain Matthews. Equivalence and Efficiency of Image Alignment Algorithms. In IEEE Conf. Vis. Patt. Recogn., vol. 1, pp. 1090-1097, Dec. 2001.
Simon Baker and Iain Matthews. Lucas-kanade 20 years on: A unifying framework'. Int. J. Comput. Vis.', 56(3):221-255, Mar. 2004.
Jianbo Shi and C. Tomasi. Good features to track. In IEEE Conf. Vis. Patt. Recogn., pp. 593-600, Jun. 1994.
Myung Hwangbo, Jun-Sik Kim, and Takeo Kanade. Gyro-aided feature tracking for a moving camera: fusion, auto-calibration and GPU implementation. Int. J. of Robot. Res., 30(14):1755-1774, Dec. 2011.
Jean-Yves Bouguet. Pyramidal Implementation of the Lucas Kanade Feature Tracker Description of the algorithm, 2000.
L. Matthews, T. Ishikawa, and S. Baker. The Template Update Problem. IEEE Trans. Pall. Anal. Mach. Intell., 26(6):810-815, Jun. 2004.
Reg G. Willson and Steven A. Shafer. What is the center of the image? J. Opt. Soc. Am. A, 11(11):2946-2955, Apr. 1993.
Joao P. Barreto. A Unifying Geometric Representation for Central Projection Systems. Comput. Vis. Imag. Unders., 103(3):208-217, Jun. 2006.
Joao P. Barreto, Jose Roquette, Peter Sturm, and Fernando Fonseca. Automatic Camera Calibration Applied to Medical Endoscopy. In Brit. Mach. Vis. Conf., Sep. 2009.
M. Menem, "Constraints on perspective images and circular panoramas," BMVC, Sep. 2004.
D. Claus and A. Fitzgibbon, "A Rational Function lens distortion model for general cameras," Computer Vision and Pattern Recognition IEEE Computer Society Conference on, pp. 213-219, vol. 1, Jun. 2005.
Bill Triggs, Philip F. McLauchlan, Richard I. Hartley, and Andrew W. Fitzgibbon. Bundle adjustment—a modern synthesis. In Proceedings of the International Workshop on Vision Algorithms: Theory and Practice, ICCV '99, pp. 298-372, London, UK, Springer-Verlag, 2000.
Greg Welch and Gary Bishop. An Introduction to the Kalman Filter. Technical report, University of North Carolina at Chapel Hill, Chapel Hill, N.C., USA, 1995; updated Jul. 2006.
Simon Baker, Daniel Scharstein, J. P. Lewis, Stefan Roth, Michael J. Black, and Richard Szeliski. A database and evaluation methodology for optical flow. Int. J. Comput. Vision, 92(1), Dec. 2011.

(56) References Cited

OTHER PUBLICATIONS

Steffen Gauglitz, Tobias Hollerer, and Matthew Turk. Evaluation of Interest Point Detectors and Feature Descriptors for Visual Tracking. Int. J. Comput. Vis., 94(3):335-360, Mar. 2011.

K. Daniilidis, A. Makadia, and T. Bulow. Image Processing in Catadiop-tric Planes: Spaciotemporal Derivatives and optical Flow Computation. In Int. Workshop on Omndirectional Vision, Jun. 2002.

M. Lourenco, J. P. Barreto, and F. Vasconcelos. sRD-SIFT: Keypoint Detection and Matching in Images With Radial Distortion. IEEE Trans Robotics, Jun. 2012.

P. Sturm, S. Ramalingam, J.-P. Tardif, S. Gasparini and J. Barreto, Camera Models and Fundamental Concepts Used in Geometric Computer Vision. Now Publishers, Inc., Jan. 2011.

David Nistér. An Efficient Solution to the Five-Point Relative Pose Problem. IEEE Trans. Patt. Anal. Mach. Intell., Jun. 26, 2004.

R. Melo, J.P. Barreto, and G. Falcao. A new solution for camera calibration and real-time image distortion correction in medical endoscopy-initial technical evaluation. Biomedical Engineering, IEEE Transactions on, 59(3):634-644, Mar. 2012.

Alper Yilmaz, Omar Javed, and Mubarak Shah. Object Tracking: A survey. ACM Comput. Surv., 38, Dec. 2006.

Marc Pollefeys, Luc Van Gool, Maarten Vergauwen, Frank Verbiest, Kurt Cornelis, Jan Tops, and Reinhard Koch. Visual Modeling with a Hand-Held Camera. Int. J. Comput. Vis., 59(3):207-232, Sep. 2004.

P. Baker, C. Fermuller, Y. Aloimonos, and R. Pless. A Spherical Eye from Multiple Cameras (Makes Better Models of the World). In IEEE Conf. Vis. Patt. Recogn., Feb. 2001.

Peter Hansen, Peter Corke, and Wageeh Boles. Wide-Angle Visual Feature Matching for Outdoor Localization. Int. J. of Robot. Res., 29:267-297, Feb. 2010.

Darius Burschka, Ming Li, Russell H. Taylor, and Gregory D. Hager. Scale-Invariant Registration of Monocular Endoscopic Images to CT-Scans for Sinus Surgery. In Med. Image Comput. and Computer-Assist Inter., Sep. 2004.

Alexander Behrens, Michael Bommes, Thomas Stehle, Sebastian Gross, Steffen Leonhardt, and Til Aach. Real-time image composition of bladder mosaics in fluorescence endoscopy. Computer Science—Research and Development, 26:51-64, Feb. 2011.

Kevin Koeser, Bogumil Bartczak, and Reinhard Koch. Robust GPU-assisted camera tracking using free-form surface models. Journal of Real-Time Image Processing, 2(2):133-147, Oct. 2007.

T. Brox and J. Malik. Large displacement optical flow: descriptor matching in variational motion estimation. IEEE Trans. Patt. Anal. Mach. Intell., 33(3):500-513, Mar. 2011.

Miguel Lourenco and Joao P. Barreto. Tracking features in uncalibrated images with radial distortion. In Eur. Conf. Comput. Vis., pp. 1-14, Oct. 2012.

C. Mei, S. Benhimane, E. Malis, and P. Rives. Efficient Homography-based Tracking and 3D Reconstruction for Single Viewpoint Sensors. IEEE Trans Robotics, Dec. 2008.

A. Rav-Acha and S. Peleg. Lucas-Kanade without Iterative Warping. In IEEE Int. Conf. Image Process., pp. 1097-1100, Oct. 2006.

C. Mei, S. Benhimane, E. Malis, and P. Rives. Constrained multiple planar template tracking for central catadioptric cameras. In British Machine Vision Conference, Sep. 2006.

A. Salazar-Garibay, E. Malis, and C. Mei. Visual tracking of planes with an uncalibrated central catadioptric camera. In IROS, Mar. 2009.

Toru Tamaki, Tsuyoshi Yamamura, and Noboru Ohnishi. Unified approach to image distortion. In ICPR, pp. 584-587, Aug. 2002.

Y. Chang, "Multi-view 3D Reconstruction for Scenes Under the Refractive plane with known vertical direction," Computer Vision (ICCV), Nov. 2011.

T. Yamaguchi, M. Nakamoto, Y. Sato, Y. Nakajima, K. Konishi, M. Hashizume, T. Nishii, N. Sugano, H. Yoshikawa, K. Yonenobu, and S. Tamura, "Camera Model and Calibration Procedure for Oblique-Viewing Endoscope," in MICCAI, pp. 373-381, Nov. 2003.

C. Wu, B. Jaramaz, and S. G. Narasimhan, "A Full Geometric and Photometric Calibration Method for Oblique-viewing Endoscope," International Journal of Computer Aided Surgery, vol. 15, pp. 19-31, Apr. 2010.

N. Fukuda, Y. Chen, M. Nakamoto, and T, "A scope cylinder rotation tracking method for oblique-viewing endoscopes without attached sensing device," Software Engineering and Data Mining, No. 1, pp. 684-687, Jun. 2010.

J. Barreto, J. Santos, P. Menezes, and F. Fonseca, "Ray-based Calibration of Rigid Medical Endoscopes," in OMNIVIS, Sep. 2008.

B. Chapman, G. Jost, and R. Van Der Pass, Using OpenMP: Portable Shared Memory Parallel Programming (Scientific Computation and Engineering Series). The MIT Press, 2008.

M. A. Fischler and R. C. Bolles, "Random Sample Consensus: A Paradigm for Model Fitting with Applications to Image Analysis and Automated Cartography," Commun. ACM, vol. 24, No. 6, pp. 381-395, Jun. 1981.

A. Agrawal, Y. Taguchi, and S. Ramalingam, "Analytical forward projection for axial non-central diotropic and catadioptric cameras," presented at the ECCV'10: Proceedings of the 11th European Conference on Computer Vision: Part III, Sep. 2010.

W. Smith, N. Vakil, and S. Maislin, "Correction of Distortion in Endoscope Images," IEEE Transactions on Medical Imaging, vol. 11, No. 1, pp. 117-122, Mar. 1992.

* cited by examiner (a) Sample sequence with RD = 30%

(b) Window Size = 11

(c) Window Size = 50

(a) Calibration estimation (b) Focal Distance estimation

METHOD FOR ALIGNING AND TRACKING POINT REGIONS IN IMAGES WITH RADIAL DISTORTION THAT OUTPUTS MOTION MODEL PARAMETERS, DISTORTION CALIBRATION, AND VARIATION IN ZOOM

RELATED APPLICATIONS

This application is a national phase filing under 35 U.S.C. 371 of International Application No. PCT/PT2013/000057, filed Oct. 7, 2013, which claims the benefit of and priority to Portuguese Patent Application No. 106564, filed Oct. 5, 2012, all of these applications are incorporated herein by reference in their entireties.

FIELD OF INVENTION

The present invention relates to the problem of aligning and tracking point regions in images acquired by cameras with radial distortion, such as medical endoscopes or cameras equipped with fish-eye lenses. The described method extends motion models and alignment techniques originally proposed to the perspective, such as the KLT tracker, to the case of images with distortion for improving the accuracy and repeatability of tracking, and for accomplishing distortion calibration and measurement of zoom variation (when applicable) using the motion of one or more points between two images.

BACKGROUND OF THE INVENTION

Tracking image key points across frames is a well studied problem due its usefulness in computer and robotic vision applications such as optical flow [1], [4], object tracking [23], and 3D reconstruction [24]. The interest in feature tracking dates back to [1], where Lucas and Kanade first propose the well known KLT tracker for computing optical flow between spatially and temporally close frames.

The original KLT method assumes a translation model and iteratively estimates the displacement vector using image alignment techniques.

In simultaneous, cameras with wide field-of-view or small size optics became increasingly popular due to their benefits in many computer vision and robotic systems: fish-eye lenses provide a wide field-of-view that proved to be beneficial for tasks like egomotion estimation [25] and visual place recognition [26]; boroscopes are employed in medical endoscopy and industrial inspection for visualizing small cavities with difficult or limited access [27]. However, the projection in these cameras with wide-angle lens presents strong radial distortion (RD) that causes a displacement of the pixel positions along radial direction that increases with the distance to the center of the image, and it is typically described by non-linear terms that are function of the image radius.

Image alignment techniques applied in a matching or tracking context rely on the assumption of a motion model that determines the type and amount of deformation that is tolerated by the tracker. Several motion models have been used in the literature but none takes into account the RD effect arising in camera devices equipped with the above-mentioned non-conventional optics. In practical terms, the inability of the currently used motion models to accommodate RD translates in more frequent template updates [7], which will introduce localization drifts [5] and, most importantly, affect the tracking accuracy and repeatability [17,7].

Despite of these facts, the KLT tracker has been applied in the past to images with significant RD [28], [29]. Some works directly apply the KLT method directly over RD images and, therefore, violate the underlying assumptions of the KLT tracker, which were done for perspective images. Other solutions used in the literature either discard the image boundaries [29], where the distortion effect is more pronounced, or correct the distortion in a pre-processing step before applying the KLT. Although the later approach is quite straightforward, the distortion rectification requires the interpolation of the image signal, which can be computationally expensive, and, even more important, unreliable since the synthetically corrected images contain artificially interpolated pixel intensities [18], [19].

This invention concerns the extension of the motion models and image alignment techniques, which were originally developed to the perspective, to the case of images with radial distortion. Such an extension is not trivial because, among other reasons, the warp for aligning the image patches depends both on local motion parameters and on global distortion parameters. Thus, all the parameters are interdependent and their estimation cannot be carried separately for each region as it usually happens for the conventional KLT approaches. This raises issues in terms of computational complexity, memory management, and real-time requirements that are overcome by a careful design of the warp models, that enables estimating the parameters using Inverse Compositional Alignment [2,3], and by applying the Schur Complement Method to efficiently compute the parameters' updates at every iteration of the minimization process. The experiments show that our method, henceforth referred as RD-KLT, dramatically improves the accuracy and repeatability of tracking while adding a computational overhead of less than 1% with respect to the equivalent KLT for perspective. In addition, the described invention also enables to calibrate radial distortion and changes in zoom by simply tracking low-level image features in two or more frames. Such automatic calibration from moving points is new and of great practical interest in application in domains like surveillance and medical endoscopy.

1) Related Work

The interest on feature tracking using image alignment techniques dates back to the 80s, when Lucas and Kanade [1] formulated the tracking using a brightness constancy assumption. Such approach as been extensively studied in the past three decades, with several improvements being proposed by computer vision and robotic community [2], [3], [6], [30], [5], [31], [32]. Most of such improvements focused on reducing computational complexity [2], [3], [33], improve tracking in wide baseline situations [6], [30], [5], or manipulating the motion models for increasing robustness against illumination changes [18]. Our invention concerns the extension of these works, which assume geometric correct perspectives, to the case of cameras with radial distortion.

Tracking based in image alignment has been studied in the context of panoramic or omnidirectional cameras in [34], [32], [35]. Mei et al. propose in [34], [32] a region-tracking algorithm for generic central cameras where the warping is formulated on the sphere in order to deal with the non-uniform sampling of catadioptric images. The approach is specific to the tracking of plane surfaces and requires the camera to be calibrated. In [35], Salazar et al. use the warping function proposed in [34,32] to perform homography-based tracking in uncalibrated images. This is accomplished by simply adding the camera intrinsics to the vector of unknown parameters to be estimated. The work of Salazar et al. is still specific to the tracking of large plane surfaces, it involves computationally expensive minimization that precludes real-time performance, and it requires tracking across three or more frames to recover the camera parameters.

Tamaki et al. propose in [36] an image alignment approach to calibrate the camera radial distortion. The method registers a distortion-free planar pattern with a distorted view of this pattern, and uses non-linear optimization to estimate the plane homography under perspective, the radial distortion, and the linear spatial changes in illumination. Like our method, the algorithm just requires two views for computing the warping parameters, but the need of a planar pattern and the requirement of having a distortion-free view of this pattern limits usability.

2) Matching Salient Points in Perspective Images Through the Registration of Local Regions Around Those Points 1. Forward Additive Alignment Matching salient points in images with a close viewpoint can be formulated as a registration problem whose goal is to perform a non-linear optimization of the sum-of-squared differences between a template region T around the salient point and an incoming images I. The goal is to compute $$\epsilon = \sum_{x \in N} [I(w(x; p)) - T(x)]^2 \quad \text{(Equation 1)}$$

where p denotes the components of the image warping function w, and N denotes the integration region of a salient points. Lucas and Kanade [1] proposed to optimize equation (1) by assuming that a current p motion vector is known and iteratively solve for p increments on the warp parameters, with equation (1) begin approximated by $$\epsilon = \sum_{x \in N} [I(w(x; p + \delta p)) - T(x)]^2 \quad \text{(Equation 2)}$$

Differentiating $\epsilon$ with respect to $\delta p$, and after some algebraic manipulations, a closed form solution for $\delta p$ can be obtained:

$$\delta p = \mathcal{H}^{-1} \sum_{x \in N} \left[ \nabla I \frac{\partial w(x; p)}{\partial p} \right]^T (T(x) - I(w(x; p))), \quad \text{(Equation 3)}$$

with $$\mathcal{H} = \sum_{x \in N} \left[ \nabla I \frac{\partial w(x; p)}{\partial p} \right]^T \left[ \nabla I \frac{\partial w(x; p)}{\partial p} \right]$$

being a first order approximation of the Hessian matrix, and the parameter vector being additively updated by $p^{i+1} \leftarrow p^i + \delta p$ at each iteration i. This method is also known as forward additive KLT [2,3] and it requires to re-compute H at each iteration due its dependence with the gradients of the incoming image $\nabla I$.

2. Inverse Compositional Alignment

For efficiently solving equation 1, Baker and Matthews [2,3] proposed an inverse compositional method that starts by switching the roles of T and I, which results in the following cost function $$\epsilon = \sum_{x \in N} [I(w(x; p)) - T(w(x; \delta p))]^2 \quad \text{(Equation 4)}$$

In this case the motion update increments $\delta p$ are computed as:

$$\delta p = \mathcal{H}^{-1} \sum_{x \in N} \left[ \nabla T \frac{\partial w(x; 0)}{\partial p} \right]^T (I(w(x; p)) - T(x)), \quad \text{(Equation 5)}$$

with $$\mathcal{H} = \sum_{x \in N} \left[ \nabla T \frac{\partial w(x; 0)}{\partial p} \right]^T \left[ \nabla T \frac{\partial w(x; 0)}{\partial p} \right],$$

and w(x; 0) being the identity warp. H is computed using the template gradients $\nabla T$ and, therefore, it is constant during the registration procedure, leading to a significant computational improvement when compared with the forward additive KLT. Finally, the warp parameters are updated as follows:

$$w(x; p^{i+1}) \leftarrow w(x; p^i) \circ w^{-1}(x; \delta p) \quad \text{(Equation 6)}$$

where $\circ$ denotes the composition of functions. Although the update rule of the inverse compositional alignment is computationally more costly than a simple additive rule, Baker and Matthews [2,3] show that the overall computational complexity of the inverse formulation is significantly lower than that of the forward additive KLT.

3. Motion Models w for Conventional Perspective Images

The motion model (or image warping function) w used for feature tracking determines the degree of image deformation tolerated during the registration process. The original contribution of Lucas and Kanade [1,4] assumes that the neighborhood N around a salient image point u moves uniformly and, therefore, the authors model the image motion using a simple translation model. However, the deformation that it tolerates is not sufficient when the tracked image region is large, or the video sequence undergoes considerable changes in scale, rotation and viewpoint. In these situations, the affine motion model [2,3,5,6] is typically adopted w=(u; p)=(I+A)u+t where the parameter vector is $p=(a_1, \ldots, a_4, t_x, t_y)^T$, I is a 2×2 identity matrix, and $$A = \begin{pmatrix} a_1 & a_2 \\ a_3 & a_4 \end{pmatrix}.$$

Although in the examples of this document we will consider the affine motion model, the same reasoning can be applied to other types of motion models such as the homography [2,3] or the models that deal with illuminations changes [2,3,5]. In this document, we describe how these motion models, that were originally developed for perspective imagery, can be extended to take into account the image distortion effect arising in cameras equipped with unconventional optics that introduce non-linear radial distortion.

4. Template Update for Long-Term Feature Tracking

For long-term feature tracking, the template update is a critical step to keep plausible tracks. An inherent problem to the template update step is the localization error introduced whenever the template is updated [7]. High-order motion models tend to be more flexible in terms of the deformation tolerated during the registration process, with the templates being updated less frequently. This minimizes the drift in the feature localization introduced whenever a new template is captured [3,7]. Since our main goal is to perform feature (position) tracking rather than template (object/appearance)

tracking, the window around a feature position is captured whenever the squared error of equation 1 falls above some threshold, as detailed in [5].

5. Pyramidal Tracking for Initializing the Iterative Minimization

Despite of the warp complexity, the registration process may fail to converge when the initialization of the warp parameters $p^0$ is not close enough to the current motion parameters, i.e. $p^0$ is not in the convergence region C where the first order approximation of equation 2 is valid [3]. This affect can be attenuated by performing tracking using a pyramidal image representation [6], where several image resolutions are built by down-sampling the original image signal by factors of 2. A L-levels pyramidal tracking algorithm proceeds from the coarse to the finest pyramid level, with the coarsest feature position being given by $x^L=2^{-L}x$. The registration proceed at each pyramid level, with the result begin propagated to next level as $x^{L-1}=2x^L$ [5,6]. Since the integration region N is kept constant across scales, the pyramidal framework greatly improves the probability of $p^0$ belonging to C, which by consequence increases the tracking success. Typical values for L range from 2 to 5 image levels.

3) Modeling the Projection in Cameras with Radial Distortion

We assume that the effect of the distortion introduced by the camera lens can be described using the so-called first order division model [9,10,19,22], with the amount of distortion in pixel units being quantified by a single parameter ξ that will be henceforth referred as the image distortion parameter. Let $x=(x,y)^T$ and $u=(u,v)^T$ be corresponding points in distorted and undistorted images expressed with respect to a reference frame with origin in the distortion center O. The function $f_\xi$ is a vector function that maps points from the distorted image I to its undistorted counterpart $I^u$ according to:

$$u = f_\xi(x) = (1+\xi x^T x)^{-1} x \quad \text{(Equation 7)}$$

The function is bijective and the inverse mapping from I to $I^u$ is given by [9, 10]:

$$x = f_\xi^{-1}(u) = 2(1+\sqrt{1-4\xi u^T u})^{-1} u \quad \text{(Equation 8)}$$

Given that the radius of the distorted image point x is $r=\sqrt{x^T x}$, the corresponding undistorted radius is $r^u = (1\xi r^2)^{-1} r$.

Also relevant for this invention is the relation between the image distortion parameter ξ, which quantifies the effect of distortion in pixel units, and the lens distortion parameter η, that quantifies the distortion in metric units. Following the formulation used in [10], that places the division distortion model before the camera intrinsics, it comes that the relation between distorted image point x and undistorted image points $u_m$ expressed in metric units is $u_m = f_\eta(K^{-1}x)$ with K being the matrix of intrinsic parameters $$K = \begin{pmatrix} \alpha f & sf & o_x \\ 0 & \alpha^{-1}f & o_y \\ 0 & 0 & 1 \end{pmatrix}$$

where α is the aspect ratio, s the skew, f is the focal length, and $o=(o_x, o_y)$ is the principal point that coincides with the distortion center [8]. Assuming now that the camera is skewless and has unitary aspect ratio, which is a perfectly plausible assumption for modern CCD cameras, and that the image points x are expressed in a reference frame with origin in o ($o_x=o_y=0$), it comes that the relation between x and $u_m$ can be re-written as:

$$u_m = f^{-1}(1+f^{-2}\eta x^T x)^{-1} x$$

Taking into account that undistorted points in pixel and metric units are related by $u_m=f^{-1}u$, it comes from equation 7 and the result of the above equation that the image distortion parameter and the lens distortion parameter are related by the camera focal length:

$$\xi = \frac{\eta}{f^2} \quad \text{(Equation 9)}$$

This invention is applicable to cameras with lens distortion that are assumed to be skewless and with unitary aspect ratio, that the radial distortion is well described by the division model, and that the center of distortion O, in the absence of further information, is well approximated by the image center [8]. These assumptions are valid for most cameras and lenses in use, including medical endoscopes and cameras equipped with fish-eye lenses, for which all the relations derived above hold.

SUMMARY

The invention herein disclosed is a method for aligning and tracking point regions in successive pairs of images acquired by a camera with radial distortion. The point regions can either have a semantic meaning or being image neighborhoods around detected salient points, regularly re-sampled pixel positions, or dense pixel locations. The image alignment is accomplished by finding the transformation that better describes the warping undergone by the local patch between frames. This transformation, or warp model, is a parametric mapping function defined by the composition of a motion model for the alignment of perspective images with a distortion model that accounts for the radial distortion effect. Thus, the warp for aligning the image patches depends both on local motion parameters and on global distortion parameters, which means that their estimation cannot be carried separately. This raises issues in terms of computational complexity, memory management, and real-time requirements that are overcome by a careful design of the warp models, that enables estimating the parameters using Inverse Compositional Alignment, and by applying the Schur Complement Method to efficiently compute the parameters' updates at every iteration of the minimization process. The described invention also enables to calibrate radial distortion and variation in zoom by simply tracking low-level image features in two or more frames. Such automatic calibration from moving points is new and of great practical interest in application in domains like surveillance and medical endoscopy.

A more complete understanding of the invention will be appreciated from the description and accompanying drawings and claims, which follow.

BRIEF DESCRIPTION OF THE DRAWINGS

The accompanying drawings, which are included to provide a deeper understanding of the invention and are incorporated in and constitute a part of this application, illustrate embodiment(s) of the invention and together with the description serve to explain the principle of the invention. In the drawings.

DETAILED DESCRIPTION

We describe a method for aligning and matching one or more image regions in pairs of frames of the same scene acquired in different time instants by a camera with lens radial distortion that might, or might not, have variable zoom. The image region can either correspond to an object or part of an object (e.g. a plane surface), or it can be the local neighborhood around an image interest point that characterize and identify this point.

Figure 1:
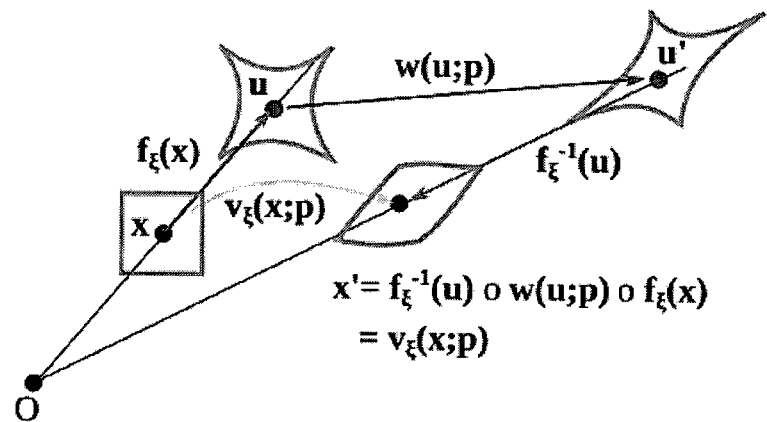
FIG. 1 shows the composition of mapping functions leading to the warp model $v_\xi(x; p)$ to be used when the image distortion parameter ξ is known 'a priori' (calibrated case also referred as cRD-KLT). This warping model explicitly models the effect of distortion; by: (1) locally correcting the distortion in a neighborhood around the salient point x; (2) applying a generic motion model w, that holds in the absence of image radial distortion; (3) distorting the warped neighborhood to fit on the distorted image with which the salient point x is matched.

1) Combining the Perspective Motion Model with the Lens Distortion Model to Obtain the Warp Model Let's consider the standard matching situation where two undistorted image regions $I^u$ and $I^{u'}$ are related by a generic motion function w such that $I^u(u)=I^{u'}(w(u; p))$. We now consider that $I^u$ and $I^{u'}$ are the warping result of the original distorted images I and I'. Using the distortion function of equation 7, we know that corresponding undistorted and distorted coordinates are related by u=f(x), so we can re-write the mapping relation as $I^u(u)=I^{u'}(w(f(x); p))$. Since $I^u(u)=I(x)$, with $x=f^{-1}(u)$, we can finally write directly the mapping relation between two distorted image signals as $I(x)=I'=(f^-)w(f(x);p)))$. Therefore, the image radial distortion compensated motion model that related the two distorted image signals is shown in FIG. 1) and can be expressed using the following function composition:

$$v_\xi(x; p) = f_\xi^{-1}(u) \circ w(u; p) \circ f_\xi(x) \quad \text{(Equation 10)}$$

2) cRD-KLT: Method for Matching Point Regions in Images with Known Distortion (Calibrated Case)

In case the ξ coefficient is known in advance, the parameter vector p of warp model $v_\xi$ comprises the same unknown parameters of the generic motion model w. The efficient inverse compositional KLT algorithm requires the proposed warp to be invertible and to have one, and only one, null element 0 for which it becomes the identity warp [2,3]. The derived warp model $v_\xi$ for the case of images with known distortion typically satisfies these requirements:

Identity: $v_\xi(x; 0)=x$
Invertibility: $v_\xi(x; p)^{-1} = (f^{-1} \circ v \circ f)^{-1} = f^{-1} \circ v^{-1} \circ f$ By replacing our motion model $v_\xi$ in the inverse composition KLT, it is straightforward to obtain the closed-form solution for δp, which is given by:

$$\delta p = \mathcal{H}_d^{-1} \sum_{x \in N} \left[ \nabla T \frac{\partial v_\xi(x; 0)}{\partial p} \right]^T (I(v_\xi(x; p)) - T(x)) \quad \text{(Equation 11)}$$

with $$\mathcal{H}_d = \sum_{x \in N} \left[ \nabla T \frac{\partial v_\xi(x; 0)}{\partial \delta p} \right]^T \left[ \nabla T \frac{\partial v_\xi(x; 0)}{\partial p} \right],$$

and the Jacobian $$\frac{\partial v_\xi(x; 0)}{\partial p}$$

being evaluated at p=0. Finally, the motion parameters are updated at each iteration as follows:

$$v_\xi(x; p^{i+1}) \leftarrow v_\xi(x; p^i) \circ v_\xi^{-1}(x; \delta p) \leftarrow f^{-1} \circ w(x; p^i) \circ w^{-1}(x; \delta p) \circ f. \quad \text{(Equation 12)}$$

3) uRD-KLT: Method for Matching Point Regions in Images with Unknown Distortion (Uncalibrated Case)

The cRD-KLT considers a warping function $v_\xi$ that compensates the radial distortion, applies the motion model, and then restores the non-linear image deformation (see FIG. 1). As we will see later, this approach is highly effective for performing image alignment of local patches in cameras with lens distortion, improving substantially the tracking accuracy and repeatability if compared with standard KLT. However, it has the drawback of requiring prior knowledge of the distortion parameter ξ, which implies a partial camera calibration. A strategy to overcome this limitation is to use the differential image alignment to estimate both the motion and the image distortion. This passes by extending the vector of model parameters P in order to consider $\xi$ as a free variable in addition to the motion variables. In this case the warping function becomes $v(x; q)$ with the difference respect to $v_\xi(x, p)$ being only the vector $q=(p, \xi)$ of free parameters to be estimated.

Unfortunately, the model $v(x;q)$ cannot be used for image registration using inverse compositional alignment. The problem is that any vector of parameters q of the form $q=(0, \xi)$ is a null element that turns the warping function into the identity mapping $$v(x; (0, \xi))=x, \forall_\xi. \qquad \text{(Equation 13)}$$

This means that the Jacobian of $v(x;q)$ evaluated for any q such that $p=0$ is singular and, consequently, $H_d$ is non-invertible precluding the use of inverse compositional alignment. An alternative would be to use the forward additive framework, since the only requirement needed is the differentiability of the warp with respect to the motion parameters [2, 3]. Unfortunately, the computational complexity of this approach is significantly higher than that of the efficient inverse formulation. Instead of using the forward additive registration, the next section proposes to approximate the warp $v(x;q)$ by assuming that the distortion is locally linear in a small neighborhood around the feature point.

1. Approximating the Distortion Model by $g_c$ to obtain the warp model $v_c$

This section shows that it is possible to avoid the singular Jacobian issue by replacing the $v(x;q)$ by a suitable approximation of the desired composed warping. As it will be experimentally shown, this approximation has minimum impact in terms of error in image registration, and enables to use efficient inverse compositional alignment to estimate both the local motion and global image distortion in an accurate and robust manner.

Let's assume that in a small neighborhood N around an image salient points c, the distortion effect can be approximated by $$f(x; \xi) \approx g_c(x; \xi)=(1+\xi c^T c)^{-1}x \qquad \text{(Equation 14)}$$

Figure 2:
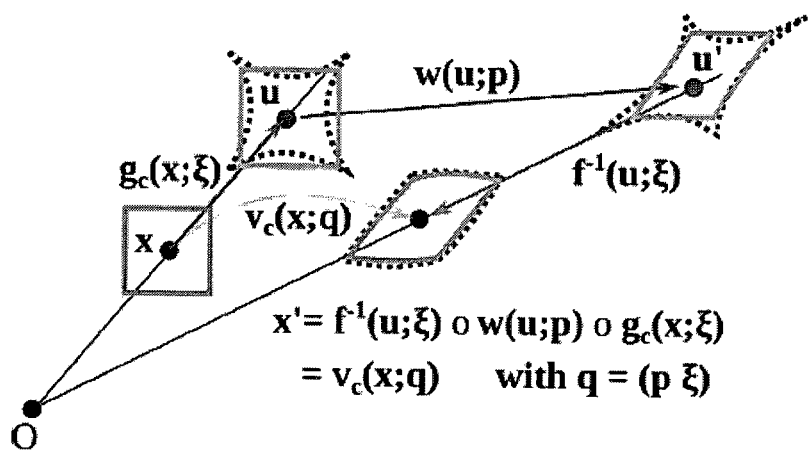
FIG. 2 shows the composition of mapping functions leading to the warp model $v_c(x; q)$ to be used when the image distortion parameter ξ is not known (uncalibrated case also referred as uRD-KLT). The approach is similar to the one of FIG. 1 except that now the distortion is corrected using the approximated distortion model $g_c(x; \xi)$. This is necessary for avoiding the final warp model to have multiple null elements in the parameters, which would preclude the use of the Inverse Compositional trick.

Remark that by replacing the radius of each point x by the radius of the central point c of the window N the non-linear distortion function f of equation 7 becomes a projective transformation $g_c(x)$ as shown in FIG. 2. This is a perfectly plausible approximation whenever the distance between the feature point c and the center of the image is substantially larger than the size of the neighborhood N. In the situations where this is not verified, the effect of distortion is negligible, and the approximation does not introduce significant error. Replacing f by $g_c$ in equation 10 yields the following approximation to the ideal theoretical model (see FIG. 2):

$$v_c(x; q)=f^{-1}(u; \xi) \circ w(u; p) \circ g_c(x; \xi) \qquad \text{(Equation 15)}$$

In this case, the warp has single null element, and the Jacobian is not singular when evaluated in $q=0$, leading to an invertible $H_d$. Remark that replacing $f^{-1}$ by $g_c^{-1}$ would again lead to a motion model with singular Jacobian and non-invertible $H_d$. 2. Using Schur Complement Method for Efficient Iterative Minimization The next step concerns the estimation of the increments $\delta_q$ of parameter vector q. Due to the global nature of the image radial distortion, the distortion coefficient $\xi$ must be simultaneously estimated for the N features being tracked, while keeping each the vector p specific for each feature. Recall that we want to compute the increment $\delta q$ using the inverse compositional algorithm, through the following closed-form solution:

$$\delta q = \mathcal{H}_d^{-1} \sum_N \left[\nabla T \frac{\partial v_\xi(x; 0)}{\partial p}\right]^T (I(v_c(x; q)) - T(x)). \qquad \text{(Equation 16)}$$

For a particular image feature $N_i$, this equation can be re-written as:

$$\underbrace{\begin{pmatrix} \bigcup_i & z_i \\ z_i^T & \lambda_i \end{pmatrix}}_{\mathcal{H}_{d,i}} \underbrace{\begin{pmatrix} \delta p_i \\ \delta \xi \end{pmatrix}}_{\delta q_i} = \begin{pmatrix} e_i \\ m_i \end{pmatrix}$$

By performing a proper block-by-block stacking, the observation of all the N tracked salient points lead to the system of equation (17):

$$\begin{pmatrix} \bigcup_1 & & & z_1 \\ & \ddots & & \vdots \\ & & \bigcup_N & z_N \\ z_1^T & \cdots & z_N^T & \lambda \end{pmatrix} \begin{pmatrix} \delta p_1 \\ \vdots \\ \delta p_N \\ \delta \xi \end{pmatrix} = \qquad \text{(Equation 17)}$$

$$\begin{pmatrix} e_1 \\ \vdots \\ e_N \\ m \end{pmatrix} \Longleftrightarrow \underbrace{\begin{pmatrix} \bigcup & z \\ z^T & \lambda \end{pmatrix}}_{B} \underbrace{\begin{pmatrix} \delta p \\ \delta \xi \end{pmatrix}}_{\delta \tilde{q}} = \begin{pmatrix} e \\ m \end{pmatrix}$$

with $\lambda = \sum_{i=1}^{N} \lambda_i$ and $m = \sum_{i=1}^{N} m_i$.

These systems of linear equations are typically solved through the computation of the pseudo-inverse of B. However, and in case of tracking many features, the explicit computation of the pseudo-inverse is computational expensive and subject to residual errors, specially for the case of large sparse matrices [11]. We now show how to explore the sparsity of our linear system to solve it efficiently.

Let's perform a block-based Gaussian elimination by multiplying equation 17 on the left by $$\begin{pmatrix} I & 0 \\ -z^T \bigcup^{-1} & 1 \end{pmatrix},$$

which yields the following:

$$\begin{pmatrix} \bigcup & z \\ 0^T & -z^T \bigcup^{-1} z + \lambda \end{pmatrix} \begin{pmatrix} \delta p \\ \delta \xi \end{pmatrix} = \begin{pmatrix} e \\ -z^T \bigcup^{-1} e + m \end{pmatrix}$$

where the scalar $-z^T U^{-1} z$ is the Schur complement of the matrix U [14]. The distortion parameter update $\delta \xi$ is simply computed using the last equation.

$$(-z^T U^{-1} z + \lambda) \delta \xi = -z^T U^{-1} e + m \qquad \text{(Equation 20)}$$

By taking advantage of the sparsity of the system, we end up with one more equation to solve when compared with the standard KLT method. Also relevant in terms of computational efficiency is the fact of most of the feature dependent blocks $(U, z, -z^T U^{-1} z)$ can be computed offline. These feature-dependent blocks are recomputed only when the correspondent feature template is updated, with the Schur complement of U being accordingly updated. The salient point dependent motion parameters can now be estimated simply by computing the following:

$$\delta p_i = U_i^{-1}(e_i - \delta \xi z) \quad \text{(Equation 21)}$$

The inverse of $U_i$ corresponds to the same computational effort of the traditional KLT tracker since $U_i$, for the case of an affine motion model, is a 6×6 diagonal matrix that can be efficiently inverted [12,13].

The final step concerns the update the current parameters estimative. In theory [2,3], the incremental warp $v_c(x;\delta q)$ must be composed with the current warp estimative. We relax this composition requirement and use an approximate relation to update the warp parameters. We start from the relation given in [2,3]

$$v_c(x; q^{i+1}) \leftarrow v_c(x; q^i) \circ v_c^{-1}(x; \delta q) \equiv v_c(v_c(s; -\delta q); q^i). \quad \text{(Equation 22)}$$

Using this equation, we can formulate the parameters update as an additive step through the computation of a Jacobian matrix $J_q$ that maps the inverse compositional increment $\delta_q$ to its additive first-order equivalent $J_q \delta_q$ [3,4], with the warp parameters being additively updated as $q^{i+1} \leftarrow q^i + J_q \delta_q$ 4) Calibrating Image Radial Distortion and Measuring Zoom Variation Using the Motion of Low-level Image Features 1. Estimating Image Distortion from Two-Frame Alignment of One or More Image Regions From the description above, it comes that in theory the uRD-KLT tracker is able to estimate the global image distortion $\xi$ parameter using as few as a single moving region (N=1) in two frames. However, and since we are assuming a warp model that only approximately describes the effective deformation of the image region, it is not clear till which extent the local motion parameters $p_i$ can partially accommodate the global distortion effect, and vice-versa. Therefore, it is important to evaluate the conditions for which the approach works and the distortion estimation is accurate. This evaluation is carried by tests in an image sequence of 20 frames with synthetically added radial distortion for obtaining accurate ground truth. We track a variable number of features across the sequence and measure the mean error in calibrating the distortion by averaging the estimations results in adjacent frames (see FIG. 3 for a sample sequence).

Figure 3:
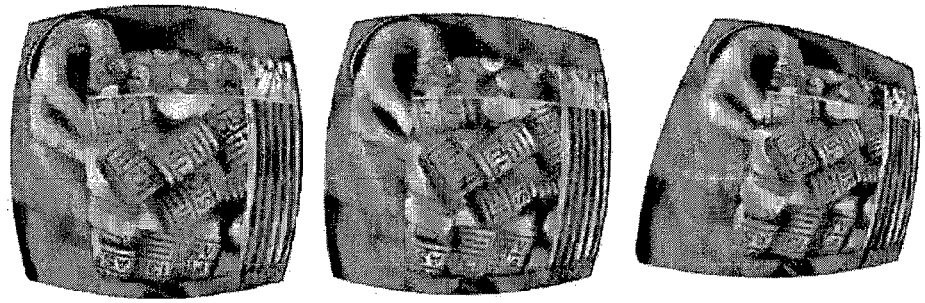
FIG. 3 studies the trade-off between the number of salient points and their neighborhood size vs quality of distortion estimation. The figures show the estimation results for an integration of 11 pixels and 50 pixels. For each window size we use a single feature, two features and 50 features during tracking. The estimation using one salient points and small size region is noisy, with erroneous estimation. Increasing the number of salient points and integration region enable to accurately estimate the distortion coefficient.
Figure 3:
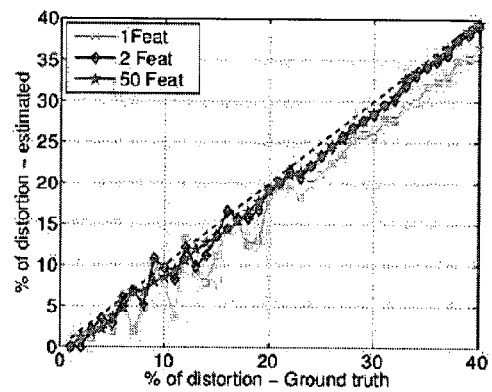
Figure 3:
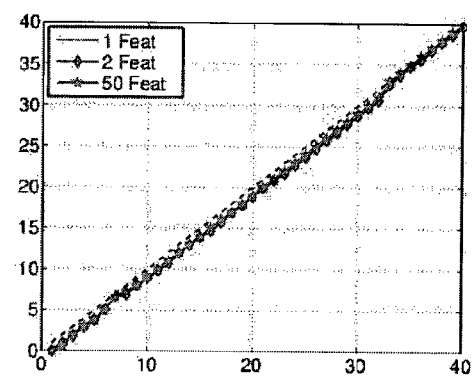

FIG. 3 compares the distortion estimation for two integrations regions of 11 and 50 pixels (the size of the image patches N). We observe that with a single feature the distortion is not very accurate because the affine motion parameters tend to compensate for the image distortion effect. For a moderate number of features, the distortion estimation is accurate, even for small integration regions. It is also interesting to observe that increasing the integration regions does not largely benefit the distortion estimation for the case of 50 features.

2. Kalman Filtering for Improving Distortion Calibration in a Sequence with No Zoom Up to now we discussed how to simultaneously estimate motion and distortion using image alignment techniques, how to solve the resulting sparse system of linear equations in a computational efficient manner, and the influence of the integration region and number of features in the quality of RD estimation. Now, we will show how we can integrate the estimates of the distortion parameter from each pair of adjacent images in a sequence using a Kalman filter [15] to obtain a more accurate and robust calibration.

When deriving the equation of a Kalman filter, the goal is to find an equation that computes the a posteriori state estimate $\hat{\phi}_k$ as a linear combination of an a priori state estimate $\hat{\phi}_k^-$ and a weighted difference of an actual measurement $z_k$. The state of our 1-D kalman filter is the distortion coefficient $\phi = \xi$, and it is assumed to be constant along the sequence (no zoom effect). Hence the process noise variance was set to zero and the time update equations used are:

$$\hat{\phi}_k^- = \hat{\phi}_{k-1}$$

$$P_k^- = P_{k-1}, \quad (23)$$

where $\hat{\phi}$ is the state estimate and P is the estimated error variance. The measurement update equations are then the following:

$$\kappa_k = P_k^- (P_k^- + R)^{-1}$$

$$\hat{\phi}_k = \hat{\phi}_k^- + \kappa_k (z_k - \hat{\phi}_k^-)$$

$$P_k = (1 - k_k) P_k^-, \quad \text{(Equation 24)}$$

where $\kappa$ is the kalman filter gain, $z_k$ is the measurement that in our case is distortion estimation between two consecutive frames, and R is the measurement noise variance [15]. The Kalman estimate $\hat{\xi}$ is incorporated in the RD compensated warp for the next frames, with the goal now being the estimation of $\delta \xi$ $$v_c(x; p, \hat{\xi} + \delta \xi) = (f \circ w \circ g_c)(x; p, \hat{\xi} + \delta \xi). \quad \text{(Equation 25)}$$

3. Estimating Relative Changes in Focal Length by Tracking Point Regions in a Sequence Acquired by a Camera with Lens Distortion and Variable Zoom Consider a camera with radial distortion and variable zoom such that the focal length f might vary during the acquisition of the image sequence. From subsection 1 follows that, for every two frames, the uRD-KLT is able to provide an accurate estimate of the image radial distortion $\xi$ measured in pixel units. However, and contrary to the case discussed in subsection 2, the variation in zoom causes $\xi$ not to be constant in the entire sequence. Let's assume that $\xi$ is the current estimate and that $\xi_0$ is the estimation from a previous pair of adjacent frames. Since the lens radial distortion $\eta$ measured in metric units is constant irrespectively of the zoom value, it comes from equation 9 that the following must hold $$\xi f^2 = \xi_0 f_0^2$$

with f and $f_0$ being the focal lengths in current and previous frames. This means that the relative change in focal length can be computed by making $$\frac{f}{f_0} = \sqrt{\frac{\xi_0}{\xi}} \quad \text{(Equation 26)}$$

and that tracking interest point in a sequence using uRD-KLT provides an effective manner of measuring zoom variation in addition to local motion and global distortion. Please note that, by explicitly calibrating the camera for a reference zoom position with [10] both $\xi_0$ and $f_0$ are known, which means that the absolute value of focal length f can be computed using the output of the uRD-KLT tracking. It is also important to refer that, in the case of variable zoom lenses, Kalman filtering can still be used to improve the estimation of the variable $\xi$ at each frame time instant being enough to replace in equation 23 the constant state model by a uniform motion model.

5) Experiments

A reliable tracking algorithm must be able to perform long-term feature tracking with high pixel accuracy [5]. Typically, the tracking performance is benchmarked through the evaluation of the tracking repeatability and the spatial accuracy of the tracking [16], [17], [5]. This section compares the standard KLT algorithm against the proposed cRD-KLT and uRD-KLT trackers in sequences with different amounts of RD. All the trackers are directly used in the images with distortion, without any type of rectification or pre-processing. To the best of our knowledge there are no other similar trackers that implicitly account for the effect of RD during the image region alignment process.

We perform experiences in sequences of scenes with depth variation, where we evaluate the accuracy of Structure-from-Motion [19]. In addition, we describe an experience with camera with variable zoom, and we show that it is possible to recover the focal distance using the uRD-KLT framework. The three methods under evaluation were implemented using the affine motion model and a squared integration window N of 11×11 inside a pyramidal image registration with L=4 resolution levels. Since our main goal is to perform feature (position) tracking rather than the template itself, we monitor the health of the template through the evaluation of the squared error of Eq. 1, with a new template being captured at the last feature position whenever required.

1) Experiment in Structure-from-Motion (SfM)

Tracking features have been successfully applied to camera motion estimation and 3D scene reconstruction [20], with accurate point correspondence across frames being of key importance [20]. In this invention, the motion estimation is carried by a sequential SfM pipeline that uses as input the tracked points obtained by the 3 competing tracking methods. The objective is to recover the motion of two sparse sequences of 45 frames (sampled uniformly from sequences of 900 frames). The first sequence is obtained using a mini-lens that presents RD≈25%, and the second sequence is captured using a boroscope with RD≈35%, commonly used in medical endoscopy and industrial inspection. The SfM pipeline iteratively adds new consecutive frames with a 5-point RANSAC initialization (using 2 views) [21], a scale factor adjustment (using 3 views) [20], and a final refinement with a sliding window bundle adjustment.

Figure 4:
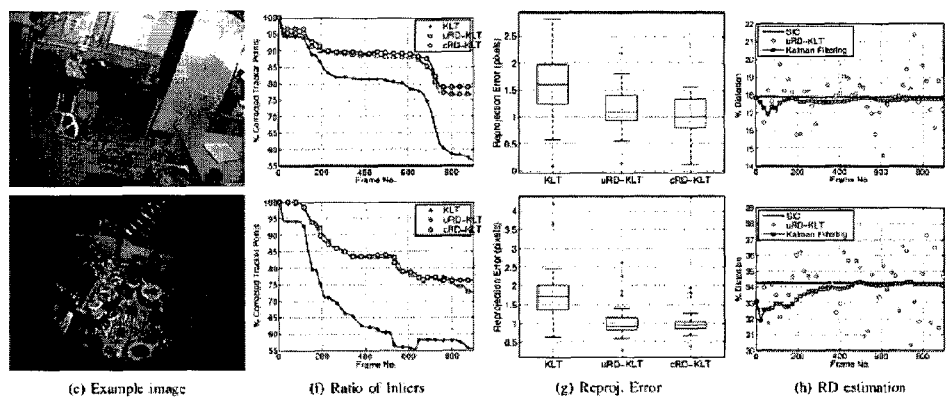
FIG. 4 shows Structure from Motion experiments with a ≈20% distortion sequence and with a endoscopic sequence with ≈35% of RD. It can be observed that the RD-KLT trackers, both in the case of the distortion being known "a priori" (cRD-KLT) and being unknown (uRD-KLT) enable long-term feature tracking (b) at a high precision accuracy (c). (d) compares the distortion estimation from uRD-KLT with the explicit calibration results [10], [22].

FIG. 4 shows the motion estimation results. It can be seen that compensating distortion enables to keeping a large number of features being tracked (better repeatability) that are more accurately tracked as proved by the higher ratio of inliers and lower re-projection error. Thus, accounting for the distortion in the warp model is important ensuring a better convergence of the registration process in images presenting significant amounts of distortion. Finally, it can be seen in FIG. 4($h$) that the distortion is robustly estimated, with the results being close to the ones obtained with the explicit calibration that provides the ground truth [10], [22]. It is also interesting to observe that the tracking performance of cRD-KLT and uRD-KLT is almost identical meaning that that there are little gains in pre-calibrating the distortion, and that the uncalibrated formulation is highly effective.

The 3 methods were implemented in Matlab/MEX files. The C-MEX files include operations that are transversal to the 3 methods, namely the interpolation routines, image gradient computation and image pyramid building. The computational times were measured in a Intel Core i7-2600 CPU @3.4 GHz. cRD-KLT (1.11 milliseconds (ms)/feature) is slightly slower than the conventional KLT (1.10 ms/feature). The uRD-KLT (1.17 ms/feature) presents a computational overhead of 6.4% with respect to the standard KLT. Such small overhead is merit of using the Schur complement method to compute the increments at each iterative step.

2) Using uRD-KLT for On-the-Fly Calibration of the Focal Length of a Camera with Zoom This experiment shows that, given an initial camera calibration computed with [10], [22], and the uRD-KLT estimation of radial distortion it is possible to compute the camera focal length when the zoom is varied.

Figure 5:
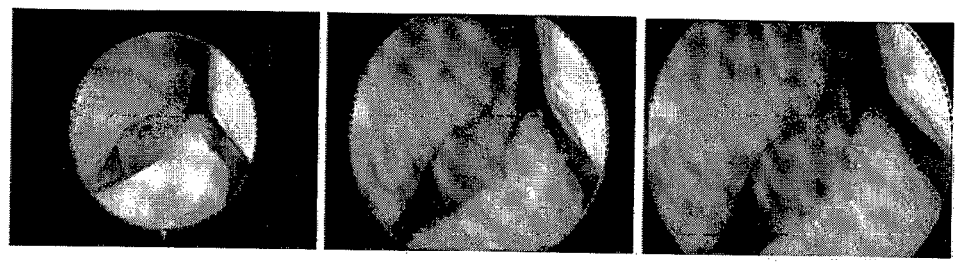
FIG. 5 shows the focal distance computation for different levels of zoom. It can be seen that due the accurate estimation of ξ from point tracking it is possible to compute the zoom variation with respect to a calibrated reference frame and consequently recovery the value of focal length at every frame time instant. The graphic on the bottom left compares the recovered focal length (uRD-SIFT) against ground truth (SIC).
Figure 5:
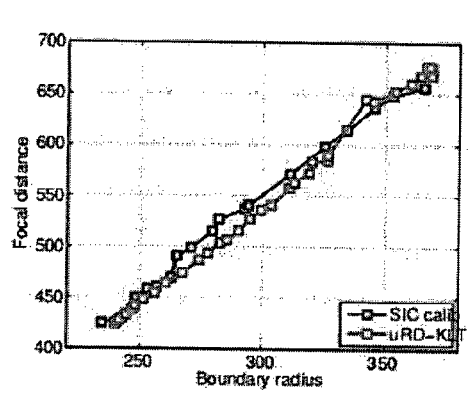
Figure 5:
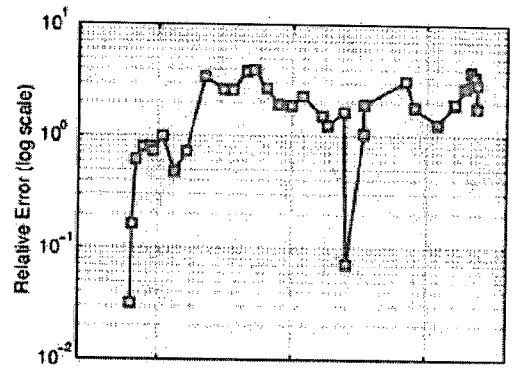

FIG. 5 compares the estimation of the focal length obtained from the uRD-KLT tracking information with the explicit SIC calibration results obtained for a certain number of zoom positions [10][22]. It can be seen that, since the $\xi$ is robustly estimated during the camera operation, it is possible to compute the focal length on-the-fly with a median error of 1.9% for the given example of 35 frames. It is also quite interesting to observe that towards the end of the sequence the zooming has stopped, and the focal length estimate stabilizes. Note that such applications is of high importance in medical applications and industrial inspection that make use of endoscopic cameras with variable zoom, since it enables to maintain the camera calibrated at every time instant.

Figure 6:
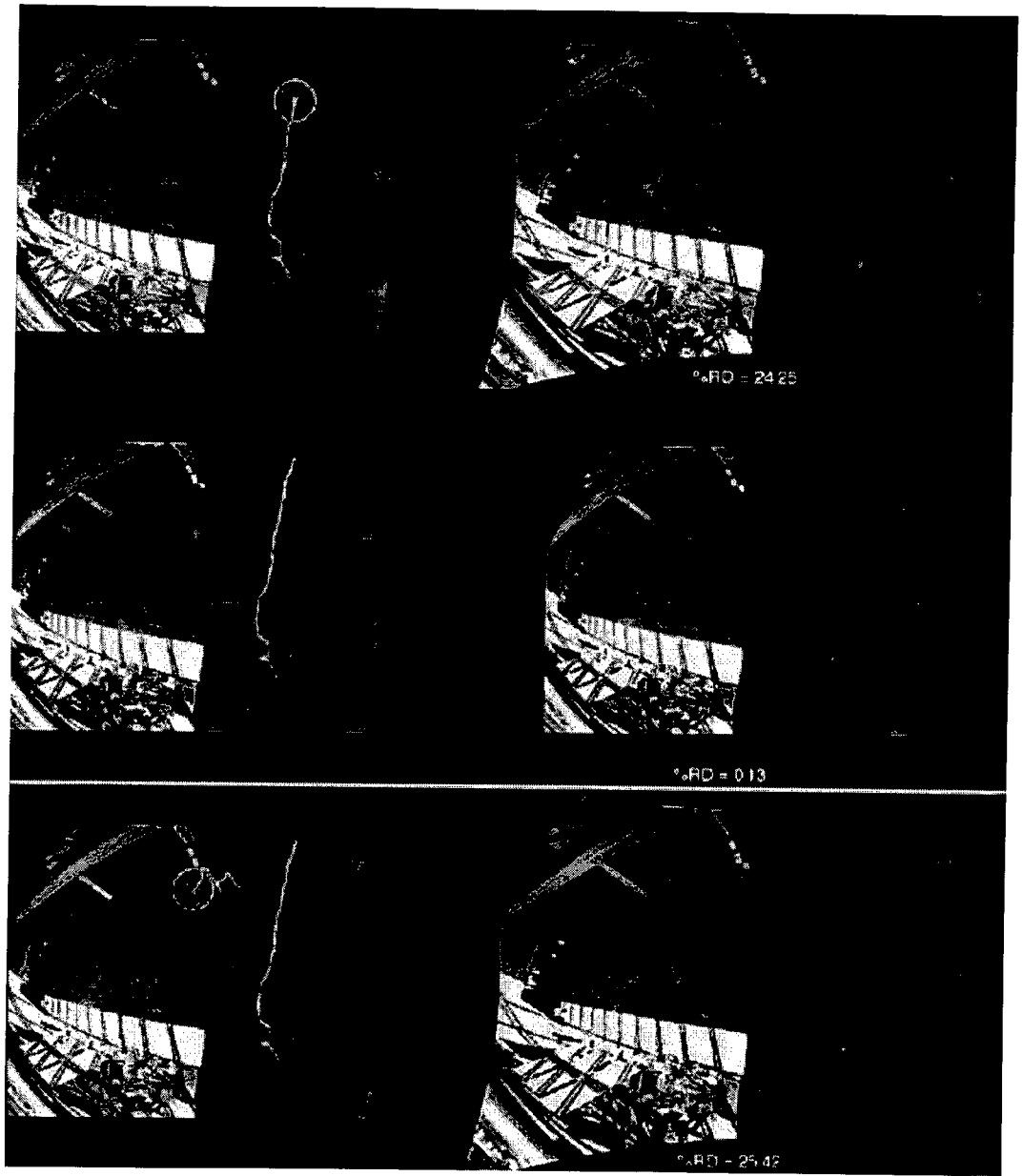
FIG. 6 shows three frames of a long sequence of a surveillance camera downloaded from the internet. The left side refers to the original frame sequence in which we use uRD-KLT to track automatically detected salient points (the overlay is an average of the tracked trajectories). The right side show the result of correcting the image distortion using the calibration provided by the uRD-KLT at every two frames (no Kalman integration). Please notice that in the middle frame the RD estimation is close to zero because there is no motion in the scene. This example illustrates the usefulness of the described invention in providing means to obtain the parameters of a remotely installed camera without any type of user intervention.

3) Using uRD-KLT for Calibrating and Correcting the Distortion of a Remote, Inaccessible Surveillance Camera FIG. 6 shows three frames of a long sequence of a surveillance camera downloaded from the internet. The left side refers to the original frame sequence in which we use uRD-KLT to track automatically detected salient points (the overlay is an average of the tracked trajectories). The right side show the result of correcting the image distortion using the calibration provided by the uRD-KLT at every two frames (no Kalman integration). Please notice that in the middle frame the RD estimation is close to zero because there is no motion in the scene. This example illustrates the usefulness of the described invention in providing means to obtain the parameters of a remotely installed camera without any type of user intervention.

REFERENCES

[1] Bruce D. Lucas and Takeo Kanade. An Iterative Image Registration Technique with an Application to Stereo Vision. In DARPA Image Understanding Workshop, pages 121-130, April 1981.

[2] Simon Baker and Iain Matthews. Equivalence and Efficiency of Image Alignment Algorithms. In IEEE Conf. Vis. Patt. Recogn., volume 1, pages 1090 - 1097, December 2001.

[3] Simon Baker and Ian Matthews. Lucas-kanade 20 years on: A unifying framework'. Int. J. Comput. Vis.', 56(3):221 - 255, March 2004.

[4] Jianbo Shi and C. Tomasi. Good features to track. In IEEE Conf. Vis. Patt. Recogn., pages 593 600, 1994.

[5] Myung Hwangbo, Jun-Sik Kim, and Takeo Kanade. Gyro-aided feature tracking for a moving camera: fusion, auto-calibration and GPU implementation. Int. J. of Robot. Res., 30(14):1755-1774, 2011.

[6] Jean-Yves Bouguet. Pyramidal Implementation of the Lucas Kanade Feature Tracker Description of the algorithm, 2000.

[7] L. Matthews, T. Ishikawa, and S. Baker. The Template Update Problem. IEEE Trans. Patt. Anal. Mach. Intell., 26(6): 810 -815, 2004.

[8] Reg G. Willson and Steven A. Shafer. What is the center of the image? J. Opt. Soc. Am. A, 11(11):2946-2955, 1994.

[9] Joao P. Barreto. A Unifying Geometric Representation for Central Projection Systems. Comput. Vis. Imag. Unders., 103(3):208-217, 2006.

[10] Joao P. Barreto, Jose Roquette, Peter Sturm, and Fernando Fonseca. Automatic Camera Calibration Applied to Medical Endoscopy. In Brit. Mach. Vis. Conf., 2009.

[11] Timothy A. Davis. Direct Methods for Sparse Linear Systems (Fundamentals of Algorithms 2). Society for Industrial and Applied Mathematics, 2006.

[12] Seon Joo Kim, J.-M. Frahm, and M. Pollefeys. Joint feature tracking and radiometric calibration from auto-exposure video. In IEEE Int. Conf. Comput. Vis., pages 1-8, 2007.

[13] Gene H. Golub and Charles F. van Van Loan. Matrix Computations. The Johns Hopkins University Press, 3rd edition, 1996.

[14] Bill Triggs, Philip F. McLauchlan, Richard I. Hartley, and Andrew W. Fitzgibbon. Bundle adjustment - a modern synthesis. In Proceedings of the International Workshop on Vision Algorithms: Theory and Practice, ICCV '99, pages 298-372, London, UK, UK, 2000. Springer-Verlag.

[15] Greg Welch and Gary Bishop. An introduction to the kalman filter. Technical report, University of North Carolina at Chapel Hill, Chapel Hill, N.C., USA, 1995.

[16] Simon Baker, Daniel Scharstein, J. P. Lewis, Stefan Roth, Michael J. Black, and Richard Szeliski. A database and evaluation methodology for optical flow. Int. J. Comput. Vision, 92(1), 2011

[17] Steffen Gauglitz, Tobias Hollerer, and Matthew Turk. Evaluation of Interest Point Detectors and Feature Descriptors for Visual Tracking. Int. J. Comput. Vis., 94(3):335-360, 2011.

[18] K. Daniilidis, A. Makadia, and T. Bulow. Image Processing in Catadiop-tric Planes: Spaciotemporal Derivatives and Optical Flow Computation. In Int. Workshop on Omndirectional Vision, 2002.

[19] M. Lourenco, J. P. Barreto, and F. Vasconcelos. sRD-SIFT: Keypoint Detection and Matching in Images With Radial Distortion. IEEE Trans Robotics, 2012.

[20] Y. Ma, S. Soatto, J. Kosecka, and S. Sastry. An Invitation to 3D Vision: From Images to Geometric Models. Springer-Verlag, 2003.

[21] David Nistér. An Efficient Solution to the Five-Point Relative Pose Problem. IEEE Trans. Patt. Anal. Mach. Intell., 26, 2004.

[22] R. Melo, J.P. Barreto, and G. Falcao. A new solution for camera calibration and real-time image distortion correction in medical endoscopy-initial technical evaluation. Biomedical Engineering, IEEE Transactions on, 59(3):634-644, 2012.

[23] Alper Yilmaz, Omar Javed, and Mubarak Shah. Object Tracking: A survey. ACM Comput. Surv., 38, 2006.

[24] Marc Pollefeys, Luc Van Gool, Maarten Vergauwen, Frank Verbiest, Kurt Cornelis, Jan Tops, and Reinhard Koch. Visual Modeling with a Hand-Held Camera. Int. J. Comput. Vis., 59(3):207-232, 2004.

[25] P. Baker, C. Fermuller, Y. Aloimonos, and R. Pless. A Spherical Eye from Multiple Cameras (Makes Better Models of the World). In IEEE Conf. Vis. Patt. Recogn., 2001.

[26] Peter Hansen, Peter Corke, and Wageeh Boles. Wide-Angle Visual Feature Matching for Outdoor Localization. Int. J. of Robot. Res., 29:267-297, 2010.

[27] Darius Burschka, Ming Li, Russell H. Taylor, and Gregory D. Hager. Scale-Invariant Registration of Monocular Endoscopic Images to CT-Scans for Sinus Surgery. In Med. Image Comput. and Computer-Assist. Inter., 2004.

[28] Alexander Behrens, Michael Bommes, Thomas Stehle, Sebastian Gross, Steffen Leonhardt, and Til Aach. Real-time image composition of bladder mosaics in fluorescence endoscopy. Computer Science—Research and Development, 26:51-64, 2011.

[29] Kevin Koeser, Bogumil Bartczak, and Reinhard Koch. Robust GPU-assisted camera tracking using free-form surface models. Journal of Real-Time Image Processing, 2(2): 133-147, 2007.

[30] T. Brox and J. Malik. Large displacement optical flow: descriptor matching in variational motion estimation. IEEE Trans. Patt. Anal. Mach. Intell., 33(3):500-513, 2011.

[31] Miguel Lourengo and Joao P. Barreto. Tracking features in uncalibrated images with radial distortion. In Eur. Conf. Comput. Vis., page to appear, 2012.

[32] C. Mei, S. Benhimane, E. Malis, and P. Rives. Efficient Homography-based Tracking and 3D Reconstruction for Single Viewpoint Sensors. IEEE Trans Robotics, 2008.

[33] A. Rav-Acha and S. Peleg. Lucas-Kanade without Iterative Warping. In IEEE Int. Conf. Image Process., pages 1097 -1100, 2006.

[34] C. Mei, S. Benhimane, E. Malis, and P. Rives. Constrained multiple planar template tracking for central catadioptric cameras. In British Machine Vision Conference, September 2006.

[35] A. Salazar-Garibay, E. Malis, and C. Mei. Visual tracking of planes with an uncalibrated central catadioptric camera. In IROS, 2009.

[36] Toru Tamaki, Tsuyoshi Yamamura, and Noboru Ohnishi. Unified approach to image distortion. In ICPR, pages 584-587, 2002.

The invention claimed is:

1. A method for matching point regions in images with radial distortion that, given two frames acquired by a camera with radial distortion, it estimates a global image distortion and local transformations undergone by the image regions between frames, the method comprising:
   i. receiving a plurality of frames acquired from the camera with radial distortion;
   ii. selecting, using a processor, set of image regions $N^i$, in a current frame T of the plurality of frames, with $i=1, 2, \ldots, K$ and $K \geq 1$;
   iii. selecting at least one motion model w with a vector of parameters p that describes one or more local deformations undergone by a plurality of generic image regions N in the case of the camera being a perspective camera with no lens distortion;
   iv. performing a 2-dimensional mapping function f, using the processor, for modelling the camera radial distortion such that a relation between a plurality of distorted image points x and a plurality of undistorted image points u, both expressed in a coordinate system with origin in the image center O, is given by $u=f(x;\xi)$ with f defined as:

$$f(x;\xi)(1+\xi x^T x)^{-1}x,$$

where $\xi$, represents an image distortion parameter that quantifies the effect of a lens radial distortion in pixel units;
   v. deriving a warping model $v_c$ that combines the motion model w for perspective images and the radial distortion model f to describe the local deformations undergone by the set of image regions $N_i$, wherein the warping model $v_c$ is obtained by the formula:

$$v_c(x; q) = f^{-1}(u; \xi) \circ w(u; p) \circ g_c(x; \xi)$$

where $q=(p\;\xi)$ is the vector of the warp parameters, $f^{-1}$ denotes the inverse of the 2-dimensional mapping function f, w is the motion model, and $g_e$ is an approximation of the mapping function f with formula:

$$g_c(x; \xi) = (1+\xi c^T c)^- x$$

with c being the coordinates of a center of a considered image region of the set of image regions;
  vi. deriving a cost function that provides a cumulative alignment error $\epsilon$ in aligning the K image regions in the current frame T, with the putative corresponding regions in a following frame I, and that has the form:

$$\epsilon = \sum_{i=1}^{K} \sum_{x \in N_i} [I(v_c(x; q_i)) - T(x)]^2$$

where $q_i$ is $$q_i = (p_i, \xi),$$

with $p_i$ being a vector of parameters of the motion model w for the case of a particular image region $N^i$, and $\xi$ being the global image distortion parameter;
  vii. estimating jointly, using the processor, the local motion parameters $p_i$ of each of the image regions and the global image distortion parameter $\xi$ using an iterative approach for minimizing the cumulative alignment error $\epsilon$;
  viii. updating, using the processor, a position and appearance of the set of image regions $N_i$ using the transformation $v_c$ derived in step (v) with the parameters $p_i$ and $\xi$ estimated in step (vii).

2. The method of claim 1, wherein the selection of image region $N_i$, in the current frame T of the plurality of frames comprises either applying a region detection algorithm, or considering fixed size image neighbourhoods around detected salient points, regularly re-sampled pixel positions, dense pixel locations, or combinations thereof.

3. The method of claim 1, wherein the motion model w is a model for describing the transformation of point regions in perspective images using one of the following models: a translation model, an affine model, a plane homography model, and models that account for both motion and changes in illumination.

4. The method of claim 1, wherein estimating jointly the local motion parameters $p_i$ of each of the image regions and the global image distortion parameter $\xi$ is performed using an iterative Inverse Compositional Alignment (ICA) approach for minimizing the cumulative alignment error $\epsilon$ except when the selected motion model w is such that the warp model $v_c$ is non-invertible or has multiple null elements 0 in the parameters, in which case the minimization is carried by at least one of the following: a Forward Additive Alignment, a Forward Compositional Alignment, and an Efficient Second Order Minimization.

5. The method of claim 1, wherein estimating jointly the local motion parameters $p_i$ of each of the image regions and the global image distortion parameter $\xi$ using an iterative approach for minimizing the cumulative alignment error $\epsilon$ comprises solving a system of interdependent linear equations using a Schur Complement Method.

6. The method of claim 1, wherein the estimation of the global image distortion parameter $\xi$ is influenced by all previous distortion estimates by using a Kalman filter.

7. The method of claim 1, further comprising tracking the set of image regions $N_i$ in a video sequence, using the processor, by repeating steps (vi) to (viii) for successive pairs of frames such that the following frame in time instant t becomes the current frame in time instant t+1.

8. The method of claim 1, further comprising calibrating and correcting, using the processor, the radial distortion in every image pixel, by using the estimated global image distortion parameter $\xi$ in the radial distortion model f.

9. The method of claim 1, further comprising estimating zoom variation, using the processor, with respect to a previous reference frame of the plurality of frames by computing a ratio between a focal length f in the current frame and the focal length $f_0$ in the previous reference frame by taking into account that $$\frac{f}{f_0} = \sqrt{\frac{\xi_0}{\xi}}$$

with $\xi$ being the global image distortion parameter measured in the current frame and $\xi_0$ being the global image distortion parameter measured in the previous reference frame.

10. The method of claim 1, wherein when the global image distortion parameter is known to have a value $\xi = r$, the warp model $v_c$ is replaced by the warp model:

$$v_\xi(x; p) = f^{-1}(u; r) \circ w(u; p) \circ f(x; r),$$

and the local motion parameters $p_i$ of each image region are estimated by minimizing, using the processor, the cumulative alignment error $\epsilon$.

11. An apparatus for matching point regions in images with radial distortion, comprising:
  a processor coupled to a non-transitory computer readable medium, wherein the non-transitory computer readable medium comprises instructions when executed by the processor causes the apparatus to:
  receive a current frame and a following frame that correspond to a scene from a camera with radial distortion;
  select one or more image regions within the current frame;
  obtain a warp model $v_c$ that is based upon combining a distortion model f with a motion model w that represents a perspective camera with no lens distortion; and
  match the one or more image regions for the current frame and a following frame by:
    approximating the distortion model f with a projective transformation to form an warp model $v_c$ that describes one or more local deformations undergone by the one or more image regions;
    obtaining a cost function that provides the cumulative errors $\epsilon$ in aligning the one or more image regions in the current frame with the one or more regions corresponding to the following frame; and
    simultaneously estimating both a plurality of motion parameters p of the motion model w and a global image distortion parameter $\xi$ of the distortion model f using an iterative approach for minimizing the cumulative alignment error $\epsilon$, wherein the plurality of motion parameters p represents local deformations; and
  update the positions and appearances of the one or more image regions using the warp model $v_c$ with the estimated motion parameters p and global image distortion parameter $\xi$.

12. The apparatus of claim 11, wherein the instructions, when executed by the processor, cause the apparatus to calibrate for an image radial distortion by replacing the estimated global image distortion parameter $\xi$ in the distortion model f.

13. The apparatus of claim 11, wherein the instructions, when executed by the processor, cause the apparatus to track the one or more image regions in a video sequence by matching the one or more image regions for the current frame and the following frame in successive pairs of frames such that the following frame in time instant t becomes the current frame in time instant t+1.

14. The apparatus of claim 11, wherein the instructions, when executed by the processor, further cause the apparatus to estimate relative changes in focal length with respect to a previous reference frame and the current frame.

15. The apparatus of claim 11, wherein the warp model $v_c$ is obtained from the formula $$v_c(x; q) = f^{-1}(u; \xi) \circ w(u; p) \circ g_c(x; \xi),$$

wherein $q=(p\xi)$ is the vector of the warp parameters, $f^{-1}$ represents the inverse of the distortion model f, w represents the motion model, and $g_c$ is given by $$g_c(x, \xi) = (1 + \xi c^T c)^{-1} x$$

wherein c represents the coordinates of the center of each considered image region.

16. The apparatus of claim 11, wherein cumulative error $\epsilon$ used to align the one or more image regions is defined:

$$\epsilon = \sum_{i=1}^{K} \sum_{x \in N_i} [I(v_c(x; q_i)) - T(x)]^2$$

where $q_i$ is $$q_i = (p_i \xi)$$

with $p_i$ being a vector of parameters of the motion model w for the case of a particular image region $N_i$ and $\xi$ being the global image distortion parameter.

17. An apparatus for matching point regions in images with radial distortion, comprising:
a processor coupled to a non-transitory computer readable medium, wherein the non-transitory computer readable medium comprises instructions when executed by the processor causes the apparatus to:
receive a current frame and a following frame that correspond to a scene from a camera with known radial distortion $\xi$;
select one or more image regions within the current frame;
obtain a warp model $v_\xi$ that is based upon combining a distortion model f with a motion model w that represents a perspective camera with no lens distortion; and
match the one or more image regions for the current frame and a following frame by:
obtaining a cost function that provides the cumulative errors $\epsilon$ in aligning the one or more image regions in the current frame with the one or more regions corresponding to the following frame; and
estimating the plurality of motion parameters p of the motion model w using a numerical approach for minimizing the cumulative alignment error $\epsilon$, wherein the plurality of motion parameters p represents local deformations; and
update the positions and appearances of the one or more image regions using a warp model $v_\xi$ with the estimated motion parameters p.

18. The apparatus of claim 17, wherein when a global image distortion parameter $\xi$ is known to have a value $\xi=r$, a warp model $v_c$ is replaced in the cost function that provides the cumulative error $\epsilon$ by the warp model:

ti $v\xi(x;p) = f^*(u;r) \circ w(u; p) \circ f(x, r)$ and the motion parameters p of each image region are estimated by minimizing the cumulative alignment error $\epsilon$.

19. The apparatus of claim 17, wherein a global image distortion parameter $\xi$ is unknown the instructions, when executed by the processor, further cause the apparatus to match the one or more image regions for the current frame and the following frame by:
approximating the distortion model f with a projective transformation to form a warp model $v_c$ that describes one or more local deformations undergone by the one or more image regions; and
simultaneously estimating both the plurality of motion parameters p of the motion model w and a global image distortion parameter $\xi$ of the distortion model f using an iterative approach for minimizing the cumulative alignment error $\epsilon$.

* * * * *